United States Patent [19]

Caunce

[11] Patent Number: 4,706,156
[45] Date of Patent: Nov. 10, 1987

[54] PROTECTION APPARATUS

[75] Inventor: Benjamin R. J. Caunce, Hixon, England

[73] Assignee: The General Electric Company, p.l.c., England

[21] Appl. No.: 850,134

[22] Filed: Apr. 10, 1986

[30] Foreign Application Priority Data

Apr. 17, 1985 [GB] United Kingdom ............... 8509858
Aug. 27, 1985 [GB] United Kingdom ............... 8521306

[51] Int. Cl.$^4$ ............................................. H02H 3/26
[52] U.S. Cl. ........................................ 361/80; 361/65
[58] Field of Search .................... 361/47, 49, 65, 79, 361/80

[56] References Cited

U.S. PATENT DOCUMENTS

| 4,293,886 | 10/1981 | Church et al. | 361/65 X |
| 4,377,833 | 3/1983 | Udren | 361/79 |
| 4,405,966 | 9/1983 | Cavero | 361/80 |
| 4,433,353 | 2/1984 | Wilkinson | 361/80 |

Primary Examiner—A. D. Pellinen
Assistant Examiner—Derek S. Jennings
Attorney, Agent, or Firm—Kirschstein, Kirschstein, Ottinger & Israel

[57] ABSTRACT

A distance relay, for indicating single phase to ground faults on a polyphase electric power transmission system, having guard zone comparators (17,18,19) generating a first guard zone quadrilateral characteristic (21,23,25,27) in respect of each phase of the system and additional comparators (43,45,47) cooperating with the guard zone comparators (17,18,19) for generating a second main quadrilateral characteristic (23,25,27,49) in respect of each phase of the system, and a logic circuit arrangement (31 to 41) whereby the relay indicates the presence of a fault on a single phase to ground within the reach of the main characteristic relating to the relevant phase only if the corresponding guard zone characteristic, and no other, indicates a fault. The slope of the reactance line (21) of each guard zone characteristic is arranged to change its slope under two-phase phase to earth fault conditions by a lesser amount than the reactance line (49) of the corresponding main characteristic. By using the comparators false operation of the relay due to changes in slope of the reactance lines of the characteristics under two-phase to ground fault conditions is avoided.

8 Claims, 6 Drawing Figures

PHASE a TO PHASE b TO GROUND FAULT

FIG.5b

PHASE a TO PHASE b TO GROUND FAULT

PROTECTION APPARATUS

BACKGROUND OF THE INVENTION

1. Field of the Invention

This invention relates to electric power transmission system protection apparatus.

2. Description of the Related Art

Such apparatuses frequently employ so-called distance relays to determine whether a fault on the system is within a predetermined distance of a monitoring point where the relay is located. The present invention is particularly concerned with distance relays which respond to single phase to ground faults, a separate such relay being normally provided for each phase of polyphase power transmission system.

Figure 1:
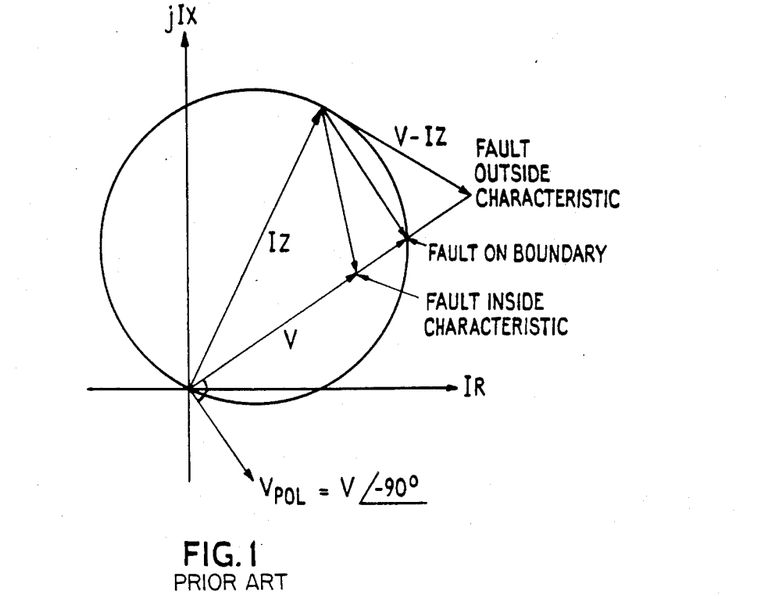
FIG. 1 is a diagram illustrating a mho characteristic relay of the PRIOR ART.

In a well-known form of such a relay the determination is made by comparing the phases of voltages derived from measurements of the system voltage and current at the monitoring point under fault conditions. For example, referring to FIG. 1, in the so-called mho characteristic relay of the PRIOR ART the phases of quantities V-IZ and $V_{pol}$ are compared where:

V is the phase voltage at the monitoring point;
I is the phase current at the monitoring point;
Z is a replica impedance which determines the setting of the relay i.e. the predetermined distance or reach; and
$V_{pol}$ is $V < -90°$.

Since the quantities V-IZ and V are necessarily at 90°, and hence the quantities V-IZ and $V_{pol}$ are necessarily in phase when the meeting point of the vectors V and V-IZ lies on a circle having IZ as diameter, by determining, using a phase comparator, whether V-IZ leads or lags $V_{pol}$ it can be determined whether the fault is beyond or within the distance for which the tip of the vector V lies on the circle.

Whilst such a relay has many applications, it suffers from the disadvantage that its reach depends on the impedance presented by the fault, and in particular, decreases significantly for faults with a high resistance e.g. such as may occur for faults near the monitoring point when the ground contact resistance is high or the lines of the system are supported on towers with high footing resistance.

Figure 2:
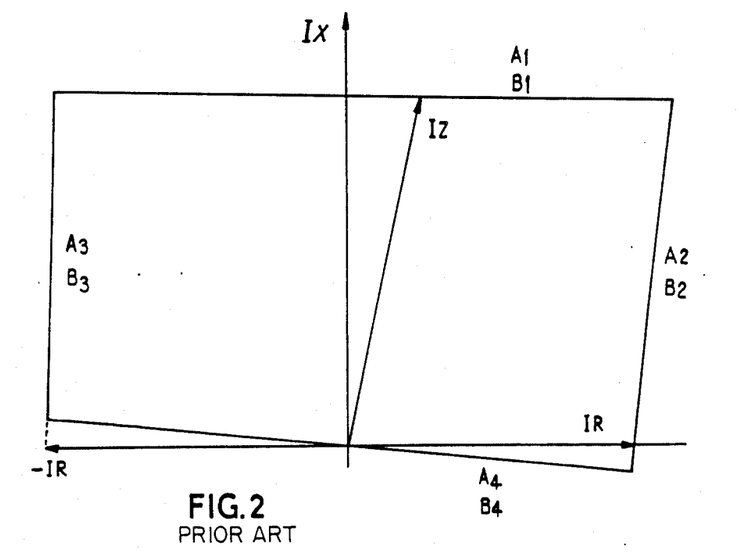
FIG. 2 is a diagram illustrating a quadrilateral characteristic distance relay of the PRIOR ART.

To overcome this problem it is known in the PRIOR ART to use a distance relay having a quadrilateral characteristic such as that shown in FIG. 2. With this relay each side of the quadrilateral characteristic is independently defined by a separate phase comparator, the four sides together defining the reach of the relay in the same way as the circle defines the reach of a mho characteristic relay.

Thus the top or "reactance" line of the quadrilateral is defined by a comparator which determines the relative phase of quantities $A_1$ and $B_1$ which are chosen according to the required slope and position of the line. Similarly the right hand "resistance" line of the quadrilateral is defined by a comparator responsive to quantities $A_2$ and $B_2$, the left hand "resistance" line of the quadrilateral is defined by a comparator responsive to quantities $A_3$ and $B_3$ and the bottom "directional" line of the quadrilateral is defined by a comparator responsive to quantities $A_4$ and $B_4$.

One difficulty which arises with a quadrilateral characteristic relay is that if the relay is optimised for single-phase to ground fault operation, when a two-phase to ground fault occurs the top side, i.e. reactance line, of the characteristic changes slope causing the relay to overreach or underreach.

To overcome this problem it has been proposed that the single phase to ground phase comparators be blocked from operation if a phase to phase fault comparator or a two-phase to ground fault comparator indicates a fault. However, this suffers from so-called 'race' problems, i.e. it necessarily requires the phase to phase fault comparator to indicate a fault first for satisfactory operation.

SUMMARY OF THE INVENTION

It is an object of the present invention to provide a distance relay for single phase to ground faults having a quadrilateral characteristic which employs a novel method of overcoming the above-mentioned problem which arises on the occurrence of two-phase to ground faults.

According to the present invention there is provided a distance relay for indicating single phase to ground faults in a polyphase electric power transmission system, the relay having a first guard zone quadrilateral characteristic in respect of each phase of the system and a second main quadrilateral characteristic in respect of each phase of the system, the relay indicating the presence of a fault on a single phase to ground within the reach of the main characteristic relating to the relevant phase only if the corresponding guard zone characteristic, and no other, indicates a fault, and the slope of the reactance line of each guard zone characteristic being arranged to change its slope under two-phase to ground fault conditions by a lesser amount than the reactance line of the corresponding main characteristic.

BRIEF DESCRIPTION OF THE DRAWINGS

One distance relay for single-phase to ground faults in accordance with the invention will now be described, by way of example, with reference to the accompanying drawings in which.

DETAILED DESCRIPTION OF THE PREFERRED EMBODIMENTS

Figure 3:
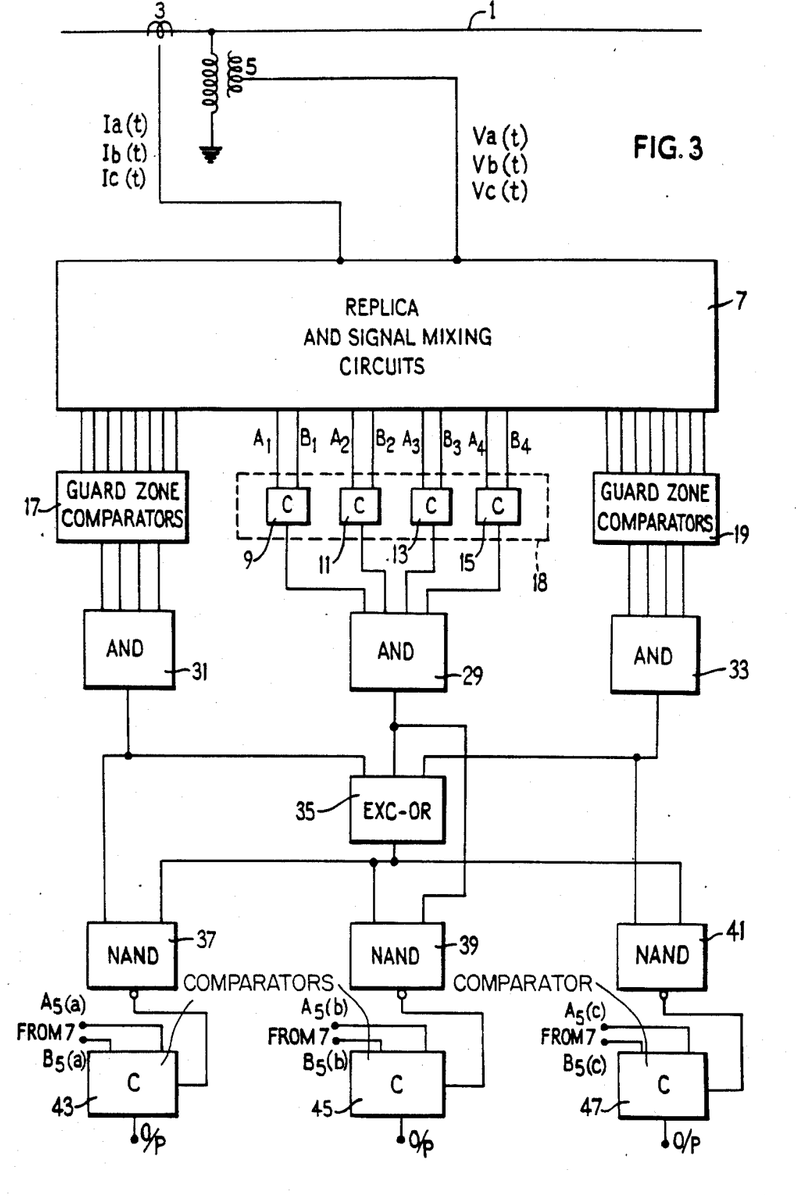
FIG. 3 is a block schematic diagram of the relay.

Referring to FIG. 3, the relay is intended to provide an output when a fault to ground appears on any one of the phases of a three-phase power transmission line 1, within a predetermined direction and distance of the point on the line 1 at which the relay is located.

The relay includes currents transformers 3 which produce signals $I_a(t)$, $I_b(t)$ and $I_c(t)$ respectively representing the phase currents at the relay location, and voltage transformers 5 which produce signals $V_a(t)$, $V_b(t)$ and $V_c(t)$ respectively representing the phase voltages at the relay location.

The signals $I_a(t)$, $V_a(t)$ etc. are fed to signal mixing and replica impedance circuits 7 wherein the various voltages required for application to phase comparators incorporated in the relay are produced.

In respect of each phase of the line 1 the relay includes a unit 17, 18 or 19 comprising four high speed comparators 9, 11, 13 and 15 which together define a guard zone quadrilateral characteristic. In FIG. 3 the four comparators 9, 11, 13 and 15 for one unit 18 only are shown, the comparator units for the other two phases each being indicated by a single box 17 or 19.

Each of the comparators 9 to 15 is of the kind which operates in response to squared-up versions A and B of the relevant input signals, which thus convey only phase angle information of the original signals. The comparators treat the input square waves A and B as logic variables and after each change in state in either input signal provide a logic output indicating whether that change of state was consistent with A leading B by 0° to 180° or with B leading A by 0° to 180°, i.e. the sequence of inputs A and B. Such a comparator is described in United Kingdom Pat. No. 1,547,360 and U.S. Pat. No. 4,104,586.

Figure 4:
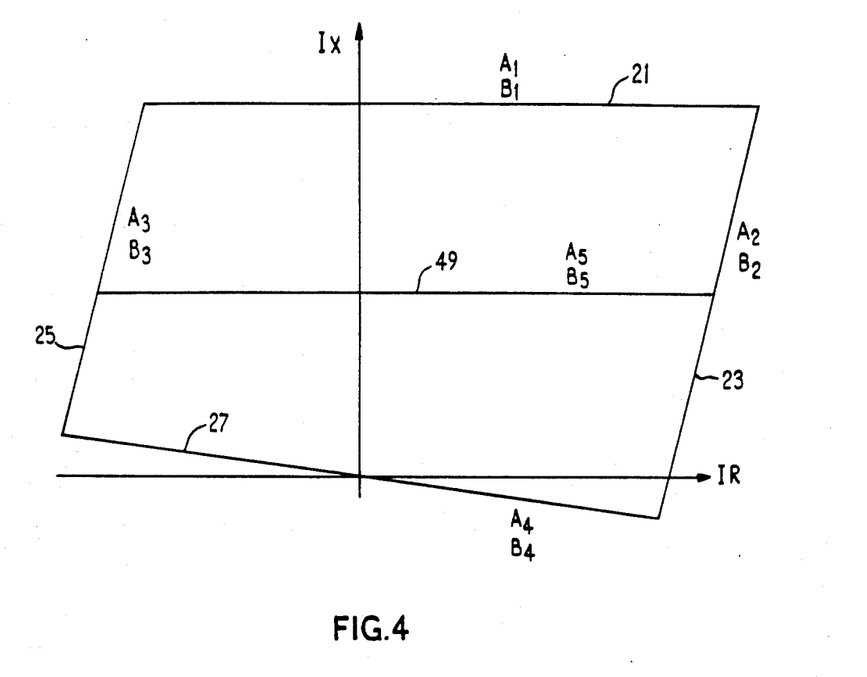
FIG. 4 is a diagram illustrating the operation of the relay under single-phase to ground fault conditions.

Referring now to FIG. 4, the four comparators 9, 11, 13 and 15 respectively define the top or "reactance" line 21 of the quadrilateral characteristic, the right-hand and left-hand or "resistance" lines 23 and 25 of the characteristic, and the bottom or "directional" line 27 of the characteristic. To this end the comparator 9 compares signals $A_1$ and $B_1$ where $$A_1 = V_{PH} - (I_{PH} Z_{PH} + I_N Z_N)$$

$$B_1 = (I_{PH} R + I_N R) \leq -3°$$

and where $V_{PH}$ and $I_{PH}$ are the relevant phase voltage and current, $I_N$ is the neutral current, $Z_{PH}$ and $Z_N$ are replica phase and neutral impedances and R is a replica fault resistance determining the setting of the relay.

As is further explained below the values of the replica impedances and resistance are chosen so that the top line is set at a position corresponding to about twice the reach actually required for the relay.

The comparator 11 compares signals $A_2$ and $B_2$ where $$A_2 = V_{PH} - I_{PH} R$$

$$B_2 = -(I_{PH} Z_{PH} + I_N Z_N)$$

The comparator 13 compares signals $A_3$ and $B_3$ where $$A_3 = -(I_{PH} Z_{PH} + I_N Z_N)$$

$$B_3 = V_{PH} + I_{PH} R$$

The comparator 15 compares signals $A_4$ and $B_4$ where $$A_4 = -(I_{PH} Z_{PH} + I_N Z_N)$$

$$B_4 = V_{pol}$$

where $V_{pol}$ is a partially cross-polarised voltage derived in known manner.

The outputs of the comparators 9, 11, 13 and 15 are applied to an AND circuit 29 so that a logic '1' appears at the output of the circuit 29 only when the sequence of the pair of signals applied to each of the four comparators is consistent with the fault lying within the guard zone characteristic, i.e. only when the fault is at a distance such that the tip of the relevant phase voltage $V_{PH}$ lies within the characteristic.

The outputs of the four comparators 17 or 19 for the other two phases are similarly all applied to an AND gate 31 or 33.

The outputs of the three AND gates 29, 31 and 33 are applied to respective inputs of an exclusive OR gate 35 so that a logic '1' appears at the output of gate 35 only if only one and no other of the AND gates 29, 31 and 33 has a logic '1' at its output, i.e. only if there is a fault to ground on one phase only of the system within the reach defined by the guard zone quadrilateral characteristics.

The output of the exclusive OR gate 35 is applied to one input of each of three two-input NAND gates 37, 39 and 41 to whose other inputs the outputs of the AND gates 29, 31 and 33 are respectively applied.

The outputs of the NAND gates 37, 39 and 41 are thus necessarily all at logic '1' when more than one phase has a ground fault within the guard zone, and when a ground fault within the guard zone is present on one phase only, the output of only the relevant one of the NAND gates assumes a logic '0'.

The outputs of the NAND gates 37, 39 and 41 respectively control the operation of three further comparators 43, 45 and 47 which respectively define for each phase a further reactance line, as indicated by line 49 in FIG. 4, which sets the actual reach required for the relay.

To this end each comparator 43, 45 and 47 compares signals $A_5$ and $B_5$ where $$A_5 = V_{PH} - I_{PH} Z_{PH} + I_N Z_N$$

$$B_5 = I_N R \leq -3°$$

It will be appreciated that the signal $B_5$ is chosen so as to optimise performance of the relay under single phase to ground fault conditions.

Each of the comparators 43, 45 and 47 produces after each change of state of either of its inputs a signal indicating the sequence of its inputs, as described above with reference to comparators 9 to 15. For each such change of state, when this signal indicates the required sequence the count of a counter is incremented by one, and the presence of a fault is indicated at the output of the comparator 43, 45 or 47 when the count reaches a predetermined value. When the output of the associated NAND gate 37, 39 or 41 is at logic '1' the counting is inhibited, counting proceeding only when the associated NAND gate output is at logic '0'.

It will thus be seen that in operation of the relay, when a fault occurs to ground on a single phase of the line, an output can appear only at the output of the relevant one of the comparators 43, 45 and 47, the relay effectively exhibiting for each phase a main quadrilateral characteristic whose top line (49, FIG. 4) is defined by the comparator 43, 45 or 47 whose side and bottom lines (23, 25, 27, FIG. 4) are defined by comparators 11, 13, and 15 in the corresponding unit 17, 18 or 19.

The logic used to derive the inhibit signals for the comparators 43, 35 and 47 is such that an output can appear at the output of a comparator 43, 45 or 47 only when a fault is within the reach of the corresponding main quadrilateral characteristic and within the reach of the corresponding guard zone quadrilateral characteristic and no other.

Hence, when a two-phase to ground fault occurs the operation of all three of the comparators 43, 45 and 47 and hence the output of the relay will necessarily be inhibited so long as the fault is within the reach of both relevant guard zone quadrilateral characteristics (21, 23, 25, 27, FIG. 4) defined by comparators 9, 11 13 and 15.

When a two-phase to ground fault occurs, the top lines (49, FIG. 4) of the main quadrilateral characteristics change slope in such a sense that the main characteristic corresponding to the leading one of the two grounded phases underreaches and the main characteristic corresponding to the lagging one of the two grounded phases overreaches. This is indicated in FIG. 5a where line 51 indicates the new position of the top line of the main characteristic corresponding to the leading phase a and in FIG. 5b where line 53 indicates the new position of the top line of the main characteristic corresponding to the lagging phase b for a phases a to b to ground fault approximately 30% outside the desired reach for single phase faults.

Figure 5A:
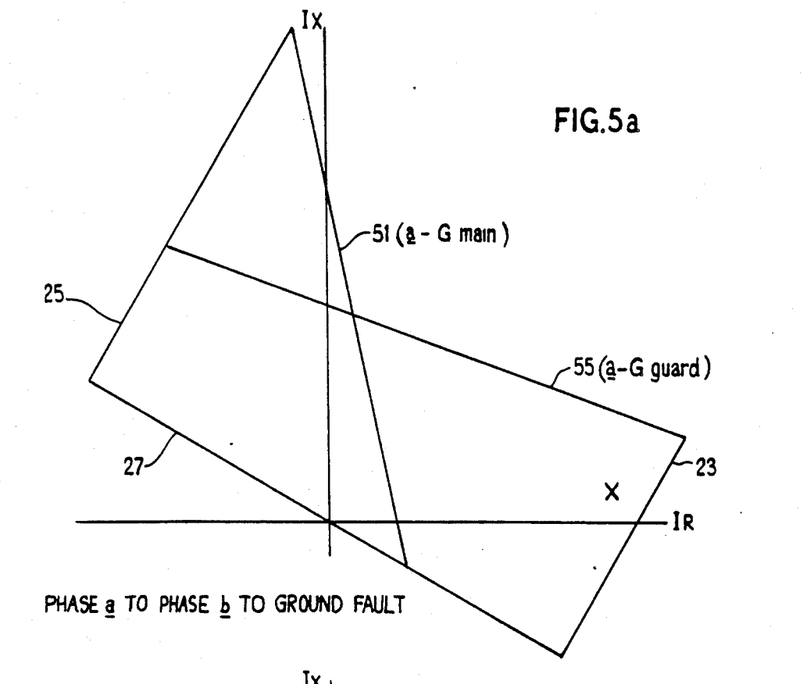
FIGS. 5a and 5b are diagrams illustrating the operation of the relay under two-phase to ground fault conditions for a fault approximately 30% outside the reach for single phase faults.
Figure 5B:
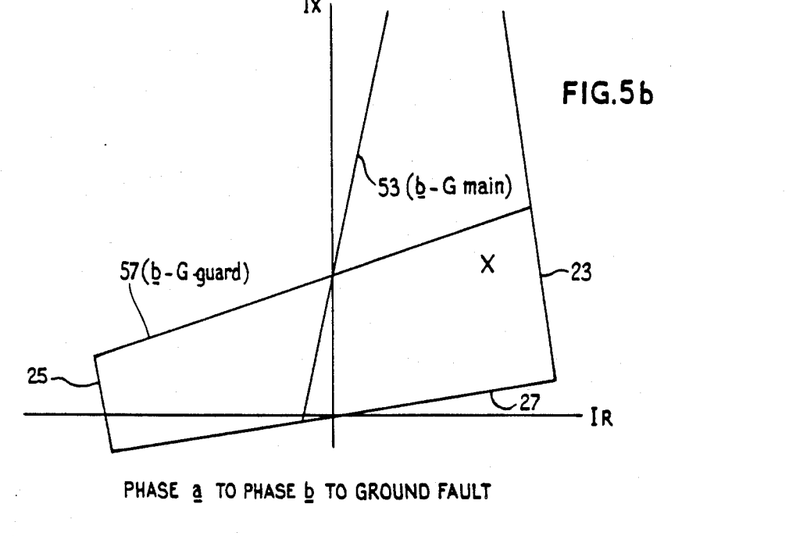

In FIGS. 5a and 5b the apparent tilting of the characteristics is due to residual compensation applied which is chosen to be correct for single phase faults.

If the top lines (21, FIG. 4) of the guard zone quadrilateral characteristics similarly changed slope, then the possibility would arise that the relay would indicate a ground fault on the lagging one of the two grounded phases.

The likelihood of this is reduced by virtue of the fact that the polarising voltages B used for the top lines 21 of the guard zone quadrilateral characteristics involve a phase current component. In consequence, these lines 21 change their slope by a lesser amount than the top lines 49 of the main quadrilateral characteristics, as indicated by line 55 in FIG. 5a and line 57 in FIG. 5b.

Hence a fault such as that indicated by x in FIGS. 5a and 5b which is within the reach of both main and guard overreaching b -G characteristics, does not cause operation of the relay since it is also within the reach of the underreaching a -G guard characteristic even although it is not within the reach of the underreaching a -G main characteristic.

It will be appreciated that as a result of including a phase current component in the $B_1$ inputs of the guard zone comparators 9, the input $B_1$ is non optimum for single phase faults and the top line may consequently droop under load exporting conditions. However, by making the guard zone reach appreciably greater than the main characteristics reach, underreach of the relay due to this cause is avoided.

It will be appreciated that in a protection apparatus using a distance relay in accordance with the invention indication of two-phase to ground faults will be carried out by further comparator arrangements dedicated to the detection of two-phase to ground faults and arranged to be practically independent of fault resistance to ground.

I claim:

1. A distance relay for indicating single phase to ground faults in a polyphase electric power transmission system comprising: means for generating in respect of each phase of the system a first guard zone quadrilateral characteristic including a reactance line; and means for generating in respect of each phase of the system a second main quadrilateral characteristic including a reactance line; the slope of the reactance line of each guard zone characteristic changing its slope under two-phase to ground fault conditions by a lesser amount than the reactance line of the corresponding main characteristic; and the relay indicating the presence of a fault on a single phase to ground within the reach of the main characteristic relating to the relevant phase only if the corresponding guard zone characteristic, and no other, indicates a fault.

2. A relay according to claim 1 wherein, for each phase, the guard zone characteristic and main characteristic are of identical form except for the positions of their reactance lines.

3. A relay according to claim 2 wherein the position of the reactance line of the guard zone characteristic corresponds to a reach substantially twice that of the reactance line of the main characteristic.

4. A relay according to claim 1 wherein each line of said characteristics is generated by a respective comparator whose output indicates the sequence of two signals applied to the input of that comparator.

5. A relay according to claim 4 wherein said two signals for the reactance line of the guard zone characteristic both include a phase current component and only one of said two signals for the reactance line of the main characteristic includes a phase current component.

6. A relay according to claim 5 wherein said two signals for the reactance line of the guard zone characteristic are $$V_{PH} - (I_{PH}Z_{PH} + I_N Z_N)$$

and $$(I_{PH}R + I_N R) \leq -x^\circ$$

and said two signals for the reactance line of the main characteristic are $$V_{PH} - (I_{PH}Z_{PH} + I_N Z_N)$$

and $$I_N R \leq -x^\circ$$

where
  $V_{PH}$ is the relevant phase voltage of the system;
  $I_{PH}$ is the relevant phase current of the system;
  $I_N$ is the neutral current of the system;
  $Z_{PH}$ is a replica phase impedance;
  $Z_N$ is a replica neutral impedance;
  R is a replica fault resistance determining the setting of the relay; and
  X is a number chosen in dependence on the required orientation of the characteristics.

7. A distance relay for indicating single phase to ground faults in a polyphase electric power transmission system comprising: means for generating in respect of each phase of the system a first guard zone quadrilateral characteristic including a reactance line; and means for generating in respect of each phase of the system a second main quadrilateral characteristic including a reactance line; the slope of the reactance line of each guard zone characteristic changing its slope under two-phase to ground fault conditions by a lesser amount than the reactance line of the corresponding main characteristic; the relay indicating the presence of a fault on a single phase to ground within the reach of the main characteristic relating to the relevant phase only if the corresponding guard zone characteristic, and no other, indicates a fault; each line of said characteristics being generated by a respective comparator whose output indicates the sequence of two signals applied to the input of that comparator; said comparators producing logic output signals; the outputs of those of the comparators generating the guard zone characteristic in respect of each phase being applied to respective inputs of a respective AND-gate; the outputs of said AND-gates being applied to respective inputs of an exclusive OR-gate and to first inputs of respective NAND-gates; the output of said exclusive OR-gate being applied to a second input of each of said NAND-gates; and the outputs of said NAND-gates being respectively applied to those of the comparators respectively generating the reactance line of the main characteristic in respect of each phase, the outputs of each said last mentioned comparators indicating the presence of a fault on respective phase of the system.

8. A relay according to claim 7 wherein each of said last-mentioned comparators incorporate a counter whose count is increased by a predetermined amount each time the comparator produces a logic signal indicating a predetermined sequence in the input signals of the counter unless the output of the associated NAND-gate has a predetermined logic output, in which case the counter is inhibited.

* * * * *

UNITED STATES PATENT AND TRADEMARK OFFICE
CERTIFICATE OF CORRECTION

PATENT NO. : 4,706,156
DATED : November 10, 1987
INVENTOR(S) : Benjamin R.J. Caunce It is certified that error appears in the above-identified patent and that said Letters Patent are hereby corrected as shown below:

Col. 1, line 29, change "$V < -90°$" to -- $V \angle -90°$ --.

Col. 3, line 32; col. 4, line 35,
    change "$\leqq -3°$" to -- $=\angle -3°$ --.

Col. 6, lines 33 and 42, change "$\leqq -x°$" to -- $=\angle -x°$ --.

Signed and Sealed this

First Day of November, 1988

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,706,156
DATED : November 10, 1987
INVENTOR(S) : Benjamin R.J. Caunce It is certified that error appears in the above-identified patent and that said Letters Patent are hereby corrected as shown below:

Col. 1, line 29, change "V $<$ -90°" to -- V $\underline{/-90°}$ --.

Col. 3, line 32; col. 4, line 35, change "= $\underline{/-3°}$" to -- $\underline{/-3°}$ --.

Col. 6, lines 33 and 42, change "= $\underline{/-x°}$" to -- $\underline{/-x°}$ --.

This certificate supersedes certificate of correction issued November 1, 1988.

Signed and Sealed this

Fourth Day of April, 1989

Attest:

DONALD J. QUIGG

*Attesting Officer*    *Commissioner of Patents and Trademarks*